Figure 1:
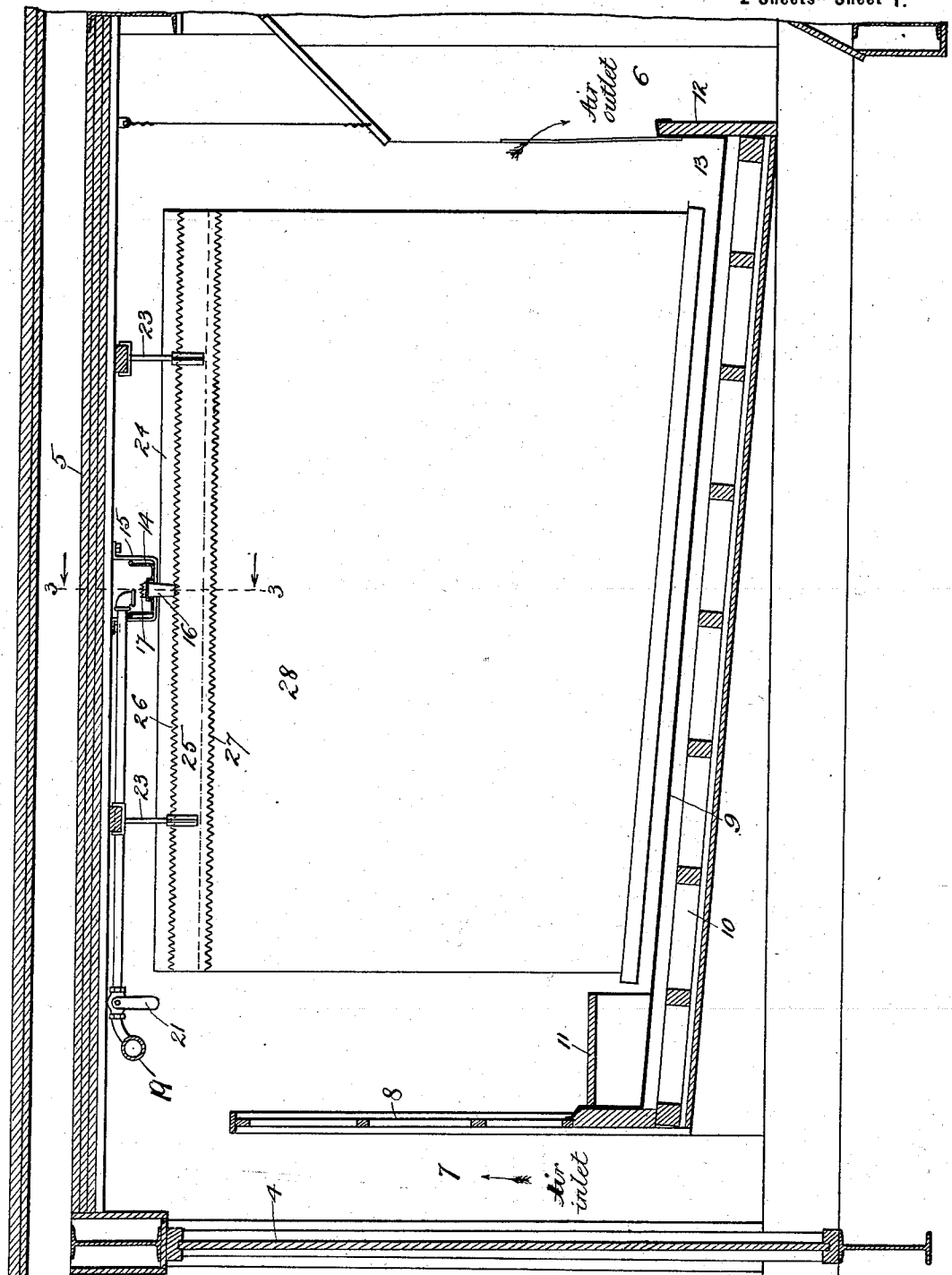

No. 654,725. Patented July 31, 1900.
H. C. GARDNER.
AIR COOLING APPARATUS.
(Application filed Apr. 21, 1898.)

(No Model.) 2 Sheets—Sheet 1.

Witnesses. Inventor
Horace C. Gardner,
by Bond Adams Pickard Jackson.
Att'ys

No. 654,725. Patented July 31, 1900.
H. C. GARDNER.
AIR COOLING APPARATUS.
(Application filed Apr. 21, 1898.)
(No Model.) 2 Sheets—Sheet 2.
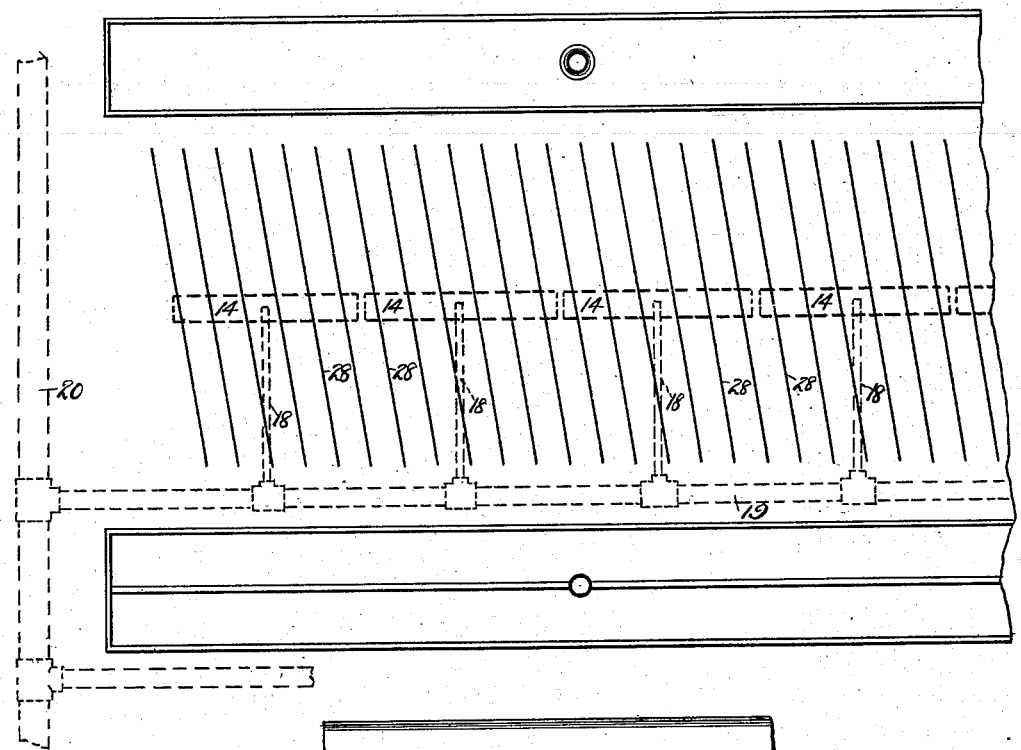
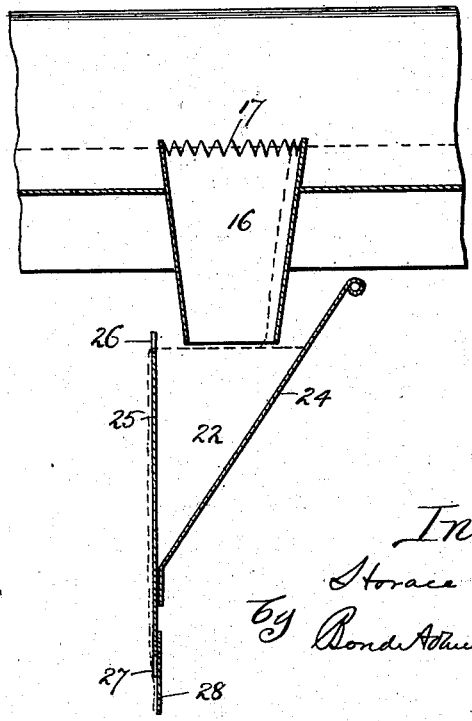

UNITED STATES PATENT OFFICE.

HORACE C. GARDNER, OF CHICAGO, ILLINOIS, ASSIGNOR TO HIMSELF AND GUSTAVUS F. SWIFT, OF SAME PLACE.

AIR-COOLING APPARATUS.

SPECIFICATION forming part of Letters Patent No. 654,725, dated July 31, 1900.

Application filed April 21, 1898. Serial No. 678,320. (No model.)

*To all whom it may concern:*

Be it known that I, HORACE C. GARDNER, a citizen of the United States, residing at Chicago, in the county of Cook and State of Illinois, have invented certain new and useful Improvements in Air-Cooling Apparatus, of which the following is a specification, reference being had to the accompanying drawings.

My invention relates to the cooling of air for use in packing-houses and for such other purposes as may be desired, and has for its object to provide means whereby the air may be economically cooled without becoming laden with moisture, as is the case where the cooling is affected by the evaporation or vaporization of a liquid.

It consists, first, in passing the air over a surface dampened with brine or equivalent liquid at a freezing temperature, so that the air is cooled by contact with the cold brine instead of by evaporation of a liquid, as has heretofore been the practice when the air has been brought into direct contact with the cooling liquid. An important advantage of this method of treatment is that the air is cooled without the absorption of moisture, and, in fact, what moisture it may originally contain is largely, if not wholly, removed by condensation in the cooling process.

My invention further possesses the advantage over systems employing a freezing liquid in closed pipes in that by bringing the air into direct contact with the freezing liquid the liquid acts directly upon it, whereas when the liquid is carried in closed pipes the metal of the pipes and the frost which rapidly accumulates thereon to a great extent insulate the freezing liquid, reducing the efficiency of the apparatus.

My invention also comprises an improved form of apparatus, as will be hereinafter particularly pointed out.

What I regard as new will be set forth in the claims.

In the accompanying drawings, Figure 1 is a transverse section of the cooling-chamber. Fig. 2 is a diagrammatic plan view. Fig. 3 is an enlarged detail, being a section on line 3 3 of Fig. 1.

Referring to the drawings, 4 indicates one of the side walls of the chamber, and 5 the ceiling, which in the construction illustrated is double.

I prefer in applying my invention practically to provide two chambers in juxtaposition to each other, providing outlet-passages between them for the cooled air, and in the accompanying drawings I have shown such an arrangement.

6 indicates the air-outlet passage.

7 indicates the air-inlet passage, which in the construction shown is arranged next to the side wall 4, as shown in Fig. 1.

8 indicates a wall or plate arranged parallel to the side wall 4 and in proximity thereto to form therewith the air-inlet passage 7, said wall serving to conduct the inflowing air to the upper portion of the chamber before it passes between the cooling-sheets, hereinafter to be described.

9 indicates the floor of the cooling-chamber, which, as shown in Fig. 1, is inclined. The floor 9 is preferably of metal and is secured to a suitable supporting-frame 10, as illustrated.

11 indicates a runway, which extends longitudinally of the wall 8.

12 indicates a curb arranged at the lower end of the floor 9, forming a gutter 13, to receive and carry off the brine which drips from the sheets.

14 indicates brine-troughs, of which any suitable number may be used, which troughs extend longitudinally of the cooling-chamber, as shown in Figs. 1 and 2, and are supported by suitable clips 15, attached to the ceiling. The troughs 14 are preferably in line with each other and are provided with discharge-spouts 16, which spouts extend up into the troughs, as shown in Fig. 3, and are provided with serrated upper edges 17, as shown. The brine is supplied to the troughs 14 through branch pipes 18, which communicate with a pipe 19, said pipe 19 in turn communicating with a main 20. Suitable valves 21 are provided between each branch pipe 18 and the pipe 19, as shown in Fig. 1, so that the supply may be cut off or regulated as desired. Each of the discharge-spouts discharges into V-shaped troughs 22, as shown in Fig. 3, which troughs are arranged angularly with reference to the troughs 14, as shown in Fig. 2, preferably at an angle of about seventy-five degrees; but this angle may be varied. As shown in Fig. 2, each trough 14 discharges into a plurality of troughs 22. The latter troughs are suspended from the ceiling by suitable hangers 23, as shown in Fig. 1.

As illustrated in Fig. 3, the front plate 24 of each V-shaped trough extends upward somewhat higher than the back plate 25, and the latter is provided with a serrated upper edge 26 and with a serrated lower edge 27. (See Figs. 1 and 3.) Secured to the lower edge of each plate 25 are sheets of canvas or other suitable material 28, as shown in Figs. 1 and 3.

The operation of my improved apparatus is as follows: The brine or other cooling liquid at a freezing temperature, preferably about 10° Fahrenheit, is admitted to the troughs 14 through the branch pipes 18, rising in such troughs until it overflows the serrated edges of the discharge-nozzles 16, through which it passes to the V-shaped troughs 22. Rising in the latter troughs until it overflows the serrated edges 26 of said troughs, it flows down the back plates 25 in a myriad of fine streams, caused by such serrations, and is discharged from the points formed by the serrations at the lower edges of such plates upon the sheets 28. By providing the serrations 26 and 27, as above described, the liquid is effectually distributed over the entire surfaces of the sheets in fine streams and is fully exposed to contact with the air which passes through the chamber. The air is admitted through the inlet 7 and discharged through the outlet 6, so that it necessarily passes between the sheets, and by arranging the sheets angularly between the inlet and outlet passages, as described, oblique channels or passages are formed for the air, which is caused to travel farther and is brought into more intimate contact with the brine carried by the sheets, thereby more effectually cooling it. At the same time the cooling of the air causes the condensation of the moisture originally contained in it, which is deposited upon the sheets and passes off with the brine, so that the air when discharged from the cooling apparatus is usually drier than when it entered it. My invention is therefore especially adapted for use in packing-houses for cooling meats, as it is very desirable that the air to which the meat is exposed be dry, as it does not then injuriously affect the meat.

I do not wish to be limited to the specific details of the apparatus described except as such details are specifically claimed, as various modifications may be made without departing from my invention.

That which I claim as my invention, and desire to secure by Letters Patent, is—

1. In a cooling apparatus, a V-shaped trough having one side higher than the other, said other side comprising a vertically-disposed plate having an upper serrated edge, and a lower portion extending below the apex of the trough and having its edge serrated, a sheet arranged along and depending below said plate, and means for admitting a cooling liquid to said trough, substantially as described.

2. In a cooling apparatus, a V-shaped trough having one side higher than the other, said other side comprising a vertically-disposed plate having an upper serrated edge, and a lower portion extending below the apex of the trough and having its edge serrated, a sheet secured along the lower edge portion of said plate and depending therefrom, and means for admitting a cooling liquid to said trough, substantially as described.

3. In a cooling apparatus, a trough 14 having a discharge-nozzle, said discharge having an upper serrated edge projecting upward in said trough, a trough 22 arranged to receive the discharge from said nozzle, and having one of its sides provided with an upper and lower serrated edge, a sheet secured along the lower edge portion of said side and depending therefrom, and means for admitting a cooling liquid to the trough 14, substantially as described.

HORACE C. GARDNER.

Witnesses:
JOHN L. JACKSON,
HOLMES A. TILDEN.